United States Patent [19]
Naito

[11] Patent Number: 6,091,469
[45] Date of Patent: Jul. 18, 2000

[54] LIGHT REFLECTOR FOR USE IN A REFLECTIVE-TYPE LIQUID-CRYSTAL DISPLAY

[75] Inventor: Nobuo Naito, Shinjuku-ku, Japan

[73] Assignee: Dai Nippon Printing Co., Ltd., Tokyo, Japan

[21] Appl. No.: 09/313,345

[22] Filed: May 18, 1999

[30] Foreign Application Priority Data

May 19, 1998 [JP] Japan .................................. 10-136518

[51] Int. Cl.⁷ .................................................. G02F 1/1335
[52] U.S. Cl. ........................................... 349/113; 359/834
[58] Field of Search ............................ 349/113; 359/831, 359/833, 834

[56] References Cited

U.S. PATENT DOCUMENTS

| | | |
|---|---|---|
| 4,310,584 | 1/1982 | Cooper et al. . |
| 5,128,787 | 7/1992 | Blonder ..................................... 359/70 |
| 5,903,392 | 5/1999 | Kojima et al. .......................... 359/599 |
| 5,995,180 | 11/1999 | Moriwaki et al. ........................ 349/96 |

FOREIGN PATENT DOCUMENTS 4-295804  10/1992  Japan .

*Primary Examiner*—James A. Dudek
*Attorney, Agent, or Firm*—Oliff & Berridge, PLC

[57] ABSTRACT

A light reflector for use in a reflective-type liquid-crystal display has a prism sheet, which is made from a transparent base material, the front surface of which has formed on it a light-diffusing layer that diffuses incident light and the reverse side of which has a plurality of unit prisms that are arranged in a striped arrangement and made of an optically transparent resin, these prisms extending in a vertical direction, and having a cross-section that is the shape of a scalene triangle, and also has a light-reflecting sheet that is in opposition to the group of prisms on the rear surface of the prism sheet, the opposing surface of this light-reflecting sheet reflecting transmitted light and being disposed in parallel to the prism sheet, so that incident light and exiting light are not mutually parallel, thereby achieving both a wide viewing angle and a bright display.

8 Claims, 5 Drawing Sheets

LIGHT REFLECTOR FOR USE IN A REFLECTIVE-TYPE LIQUID-CRYSTAL DISPLAY

BACKGROUND OF THE INVENTION

1. Field of the Invention

The present invention relates to a light reflector for use in a reflective type of liquid-crystal display, which makes use of the internal reflection in a prism to reflect light.

2. Description of the Related Art

In above-noted type of light reflector for a reflective-type liquid-crystal panel, there is the need to have high intensity, meaning that the light reflectivity is high, the need for good diffusion characteristics, so that uniform light is diffused in a desired direction, and the need for high contrast.

In the case of a reflective-type liquid crystal display 1, as shown in FIG. 5, on the observation side with respect to the liquid-crystal display element 2, a surface material 3 is disposed, this surface material 3 having the effects of preventing glare and reflection, so that light does not shine from the surface of the liquid-crystal display 1, and on the reverse side of the liquid crystal display 1, a matte reflective material 4 is disposed, this matte reflective material 4 having a matte-type finish with minute vertical unevenness on its reflecting surface.

A PET (polyethylene terephthalate) film that has a matte-finished film surface resin, or a PET film onto the surface of which is applied a matte paint layer having minute particles is used as the above-noted matte reflective material 4, a light-reflective layer is further formed thereon by vacuum deposition of a metal such as aluminum.

In the above-noted reflective type of liquid-crystal display 1, as shown in FIG. 5, while the incident light that is reflected at the matte reflective material serves as the light (reflected light) for the display, part of the incident light is reflected at the surface material 3 or the liquid-crystal element 2, this representing a wasteful reflection of light.

When the above-noted reflection occurs, because the reflective surfaces of the matte reflective material 4 and the surface material 3, for example, are mutually parallel, the angle of reflection α of the display light and the angle of reflection β at the surface material 3 are equal, so that he display light and surface reflected light rays are parallel. In the above-noted, the term angle of reflection is not the angle of reflection that the light actually makes with the surface, but rather the apparent angle of reflection with respect to the display surface of the liquid-crystal display.

As a result of the above, if observation is made from the direction of travel of the display light, the display surface appears the brightest. However, because that is also the direction of travel of the surface-reflected light, external light sources will appear on the display surface, making this the direction with the most display glare. For this reason, there is the problem that the direction from which the display appears the brightest is also the direction in which the reflected light is the strongest, thereby making the display difficult to view.

Because of the above-noted problem, there is a reflective-type liquid-crystal display 5, such as shown in FIG. 6, in which the angle of reflection α1 of the display light and the angle of reflection β1 of the surface-reflected light are made to be different.

The reflective-type liquid-crystal display 5 of FIG. 6 has a sawtooth-shaped reflective material 6 in place of the matte reflective material 4 of the reflective-type liquid-crystal display 1 of FIG. 5.

The cross-sectional shapes on the reflective surface of the sawtooth-shaped reflective material 6 are those of scalene triangles, the surface thereof that faces the liquid-crystal display element 2 being formed as a light-reflective surface by, for example, the vacuum deposition of a metal such as aluminum.

In contrast to the arrangement shown in FIG. 6, because the surface of this type of sawtooth-shaped reflective material 6 is not parallel with respect to the display surface, the angle of reflection α1 of the display light and the angle of reflection β1 of the surface-reflected light are mutually different, so that the display light and the surface-reflected light travel in different directions.

In the above-noted reflective-type liquid-crystal display 5, however, because the sawtooth-shaped reflective material 6 has a mirror-like reflective surface, there is absolutely no diffusion of light at the reflective surface and, depending upon the direction of external light, the direction in which the display appears bright is limited to an extremely narrow angle range.

Accordingly, it is an object of the present invention, in consideration of the above-described drawbacks, to provide a light reflector for use in a reflective-type liquid-crystal display that has a wide range of viewing angle, without interference from surface-reflected light, and with a bright appearance over a wide angle.

SUMMARY OF THE INVENTION

To achieve the above-noted object, the present invention as recited in claim 1 is a light reflector for use in a reflective-type liquid-crystal display that has a prism sheet, which is made from a transparent base material, the reverse side of which has a plurality of unit prisms that are arranged with a fixed pitch in either one or two dimensions, external light that is incident at the surface of this transparent sheet being internally reflected by the oblique surfaces of the above-noted unit prisms, so that it passes through the transparent base sheet and exits therefrom. In this light reflector, the unit prisms of the prism sheet have the shape of a triangle that has a base that is parallel to the reverse side of the sheet and a vertex that protrudes toward the side opposite the reverse side of the sheet and, if the angle that one of the oblique sides of this triangle makes with respect to the normal direction is θ1 and the angle that the other oblique side of this triangle makes with respect to the normal direction is θ2, the refractive index of the above-noted prism sheet material is n, the angle of incidence of external light with respect to the light-diffusing layer is θ0, under the condition that θ1>θ2, a light reflector for a reflective-type liquid-crystal display that satisfies the conditions $$\theta 2 < 90° - \sin^{-1}(1/n)$$

and $$\theta 1 = 90° + \sin^{-1}(\sin \theta 0/n)/2$$

achieves the above-noted object of the present invention.

In the above-noted light reflector for use in a reflective-type liquid-crystal display, it is also possible to have the angle θ2 such that it satisfies the condition $\theta 2 > \sin^{-1}(\sin \theta 0/n)/2$.

In the above-noted light reflector for use in a reflective-type liquid-crystal display, it is also possible to have θ1 and θ2 so that the condition $\theta 1 + \theta 2 \leq 180° - 2\{90° - \sin^{-1}(1/n)\}$.

Additionally, in the above-noted light reflector for use in a reflective-type liquid-crystal display, it is possible to make the sum of θ1+θ2 be approximately 90°.

In the above-noted light reflector for use in a reflective-type liquid-crystal display, it is also possible to have on the surface of the transparent base material a prism sheet onto which is formed a light-diffusing layer that diffusing light.

Additionally, in the above-noted light reflector for use in a reflective-type liquid-crystal display, it is possible to provide a light-reflecting sheet that is disposed in opposition to the unit prisms of the prism sheet, the surface of this light-reflecting sheet that opposes the unit prisms reflecting transmitted light.

In the above-noted light reflector for use in a reflective-type liquid-crystal display, it is possible that the material that forms the prism sheet be either a UV-cured resin or an EB-cured resin.

In the present invention, the cross-section shape of the unit prisms in the prism sheet is that of an scalene triangle, by virtue of which the directions of the incident light and the reflected light differ, thereby eliminating interference from the surface-reflected light, while providing a bright display over a wide angle and increasing the viewing angle.

DESCRIPTION OF THE PREFERRED EMBODIMENTS

Embodiments of the present invention are described below in detail, with reference being made to the relevant accompanying drawings.

Figure 1:
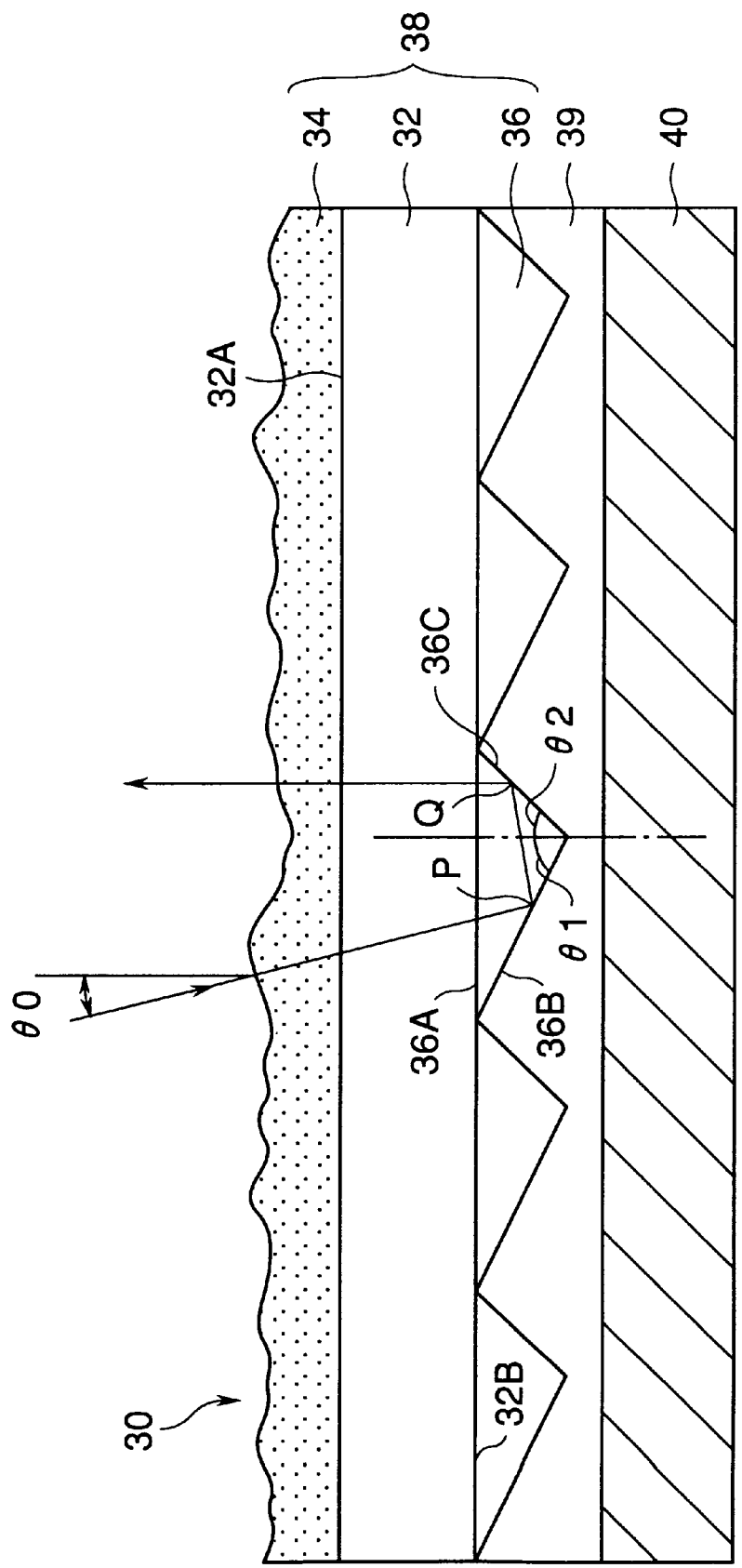
FIG. 1 is an enlarged cross-section view that shows the main part of a light reflector for use in a reflective-type liquid-crystal display according to an embodiment of the present invention.

As shown in FIG. 1, an embodiment of a light reflector 30 for use in a reflective-type liquid-crystal display according to the present invention is disposed at the rear surface of a reflective-type liquid-crystal display panel(not shown in the drawing), and has a prism sheet 38, which is made up of a transparent base material 32, on the front surface 32A of which is formed a light-diffusing layer 34 that diffuses light, and on the rear surface 32B of which is formed a plurality of unit prisms 36 arranged at a uniform pitch in one direction, and a light-reflecting sheet 40, which is disposed in opposition and parallel to the unit prisms of the above-noted prism sheet 38, this opposing surface reflecting transmitted light in the direction of the prism sheet 38. External incident light from the front surface 32A that passes through the light-diffusing layer 34 is internally reflected by the oblique surfaces of the unit prisms 36 on the above-noted light-reflecting sheet 40 side, so that it exits from the light-diffusing layer 34, the unit prisms 36 of the prism sheet 38 having a cross-sectional shape, such as shown in enlarged form in FIG. 2, this being a triangle that is formed by a base 36A that is parallel with the rear surface 32B and a vertex that protrudes in the direction of the light-reflecting sheet 40, the oblique sides 36B and 36C of the triangle being such that the angles θ1 and θ2, respectively, that they make with a line normal to the prism sheet 38 surface are mutually different, so that light that is incident at an inclination exits perpendicularly from the surface.

Stated in more detail, if the refractive index of the unit prisms 36 is n, the angle of incidence of external light with respect to the light-diffusing layer 34 is θ0, the angles made by the oblique sides 36B and 36C with respect to a normal line at the rear surface 32B are θ1 and θ2, respectively, with θ1>θ2, the angles θ1 and θ2 are established by the following equations (1) and (2).

$$\theta 2 < 90° - \sin^{-1}(1/n) \quad (1)$$

$$\theta 1 = 90° - \theta 2' + \sin^{-1}(\sin \theta 0/n)/2 \quad (2)$$

In addition, $\theta 2 > \sin^{-1}(\sin \theta 0/n)/2$.

In actuality, the refractive index n of the unit prisms 36 is determined by the material thereof, and with respect to this value of n, the value of θ2 is determined from equation (1) and the specific value of θ2', which is the range of specific values of θ2 to be substituted in equation (2) are determined, and then, based on the angle of incidence θ0, the value of θ1 is determined from the above-noted values of n and θ2', using equation (2).

If the refractive index of the resin of the unit prisms 36 is, for example, 1.57, from equation (1), θ2 is less than 50.4°. If θ2, which is the range of specific values of θ2 is θ2'=30° to 40°, because the angle of incidence θ0 of light to a reflective-type liquid-crystal display panel is often in the range 20° to 30°, based on these values of n, θ2, and θ0, from equation (2), θ1=56° to 70°.

Additionally, the condition under which incident light undergoes two total internal reflections is given by the equation (3) below.

$$\theta 1 + \theta 2 \geq 180° - 2\{90° - \sin^{-1}(1/n)\} \quad (3)$$

The transparent base material sheet 32 can intrinsically be completely eliminated, and it is possible to form the unit prisms 36 directly onto the rear of the light-diffusing layer 34. The light-diffusing layer 34 diffuses exiting light, and has is made of a light-diffusing material that is distributed within a transparent resin material. Exiting light is diffused by the light-diffusing layer 34, this having the effect of broadening the viewing angle.

The unit prisms 36 are substantially of uniform shape in the form of stripes, and formed of an optically transparent resin, these being arranged so that they extend in a direction that is perpendicular with respect to the lines of view when the liquid-crystal panel is viewed with two eyes. The unit prisms 36 reflect transmitted light without loss, and have the effect of increasing the intensity of reflection at the screen.

If the vertex angle of the unit prism 36 is made greater than 90°, even if the cross-section is that of a isosceles triangle, incident light rays, after being reflected at points P and Q on the prism oblique sides 36B and 36C (with part of the light being transmitted in the direction of the light-reflecting sheet 40), are not parallel to the original incident light path, but are rather reflected in a diffused condition. In principle, in the case in which the vertex angle is 90°, an incident light ray is reflected in parallel and the gain becomes large. If the vertex angle is larger or smaller than 90°, however, the gain will be lowered in either case.

The spacing part 39 between the prism sheet 38 and the light-reflecting sheet 40 need not absolutely be provided, and these sheets can be directly adhered to one another. At the points P or Q, part of the light that is not reflected, but rather is transmitted through the unit prisms 36 is reflected by the light-reflecting sheet 40, so that it is returned to the unit prisms 36.

Next, a method for manufacturing the above-noted light reflector 30 will be described.

First, a transparent sheet base material 32 is prepared. This transparent base material sheet 32 has transparency, is resistant to heat and solvents, has dimensional stability, and can be used repeatedly as a screen, enabling free selection of a material, as long as it has the required strength. Specifically, it is possible to use a sheet or plate of polyethylene terephthalate resin, triacetyl cellulose resin, polyethylene naphthalate resin, polyvinyl chloride resin, polypropylene resin, acrylic resin, polyimide resin, diacetate resin, triacetate resin, polystyrene resin or the like, having a thickness of 50 to 500 $\mu$m, and preferably having a thickness in the range of 75 to 200 $\mu$m.

Next, a light-diffusing layer 34 is formed on the above-noted transparent base material sheet 32. To do this, a composition made of a transparent light-diffusing substance distributed in a resin binder is used. The binder resin can be polyester resin, polyvinyl chloride resin, acrylic resin, epoxy resin, or polyolefin, used singly or a mixture. It is desirable that the refractive index of these materials be in the range 1.35 to 1.60.It is possible to use either an organic or an inorganic light-diffusing substance, and it is appropriate that the particle size thereof be in the approximately range from 1 $\mu$m to 50 $\mu$m.

The application of a light-diffusing substance onto the transparent base material sheet 32 is can be done using roll coating, knife coating, gravure coating, reverse coating, bar coating or other such coating methods, as appropriate. The approximate applied thickness should be 10 $\mu$m to 50 $\mu$m when dried.

To form the prisms on the rear surface 32B of the transparent base material sheet 32, another transparent material is used, and this is preferably an epoxy, a polyester, an acrylic, or a urethane acrylate UV-cured or EC-cured resin. The required prism shape can be formed by supplying a continuously ejected resin composite between a die roll, on the peripheral surface of which is formed the prism shape, and the transparent base material sheet 32, the transparent base material sheet 32 being cured by exposure to ultraviolet light as it passes along the die roll. It is also possible to prepare a transparent base material sheet 32 onto which is formed a light-diffusing layer and a sheet onto which is formed a group of prisms separately, and then to laminate these sheets.

The pitch of the unit prisms 36 will differ depending upon the size of the pixels that make up images, and this is usually a pitch of approximately 0.02 mm to 2.00 mm. The lamination of a prism sheet 38 formed in this manner with a light-reflecting sheet 40 completes the fabrication of the light reflector 30 according to the present invention.

The light-reflecting sheet 40 that opposes the unit prisms 36 is a mirror-finished reflecting sheet, a light-diffusing sheet, a sheet having a multilayer dielectric film, or a retroreflective sheet or the like, which reflects light that has been passed through the prism sheet 38 back in the direction of the prism sheet 38.

The above-noted mirror-finished sheet can be a sheet such as one fabricated by vacuum depositing or plating a film of silver, aluminum, chromium, gold, or copper or the like onto a film or plate, and the light-diffusing reflective sheet can be, for example, a PET (polyethylene terephthalate) foam, or paper.

The above-noted multilayer dielectric film can be multiple layers having a differing refractive index, produced by vacuum deposition or coating onto PET or polycarbonate and, in the case of a light-transmissive high polymer multilayer film, it is possible to use method that is disclosed in U.S. Pat. No. 4,310,584, or the method of manufacturing disclosed in the Japanese Unexamined Patent Application publication H4-295,804.

Figure 2:
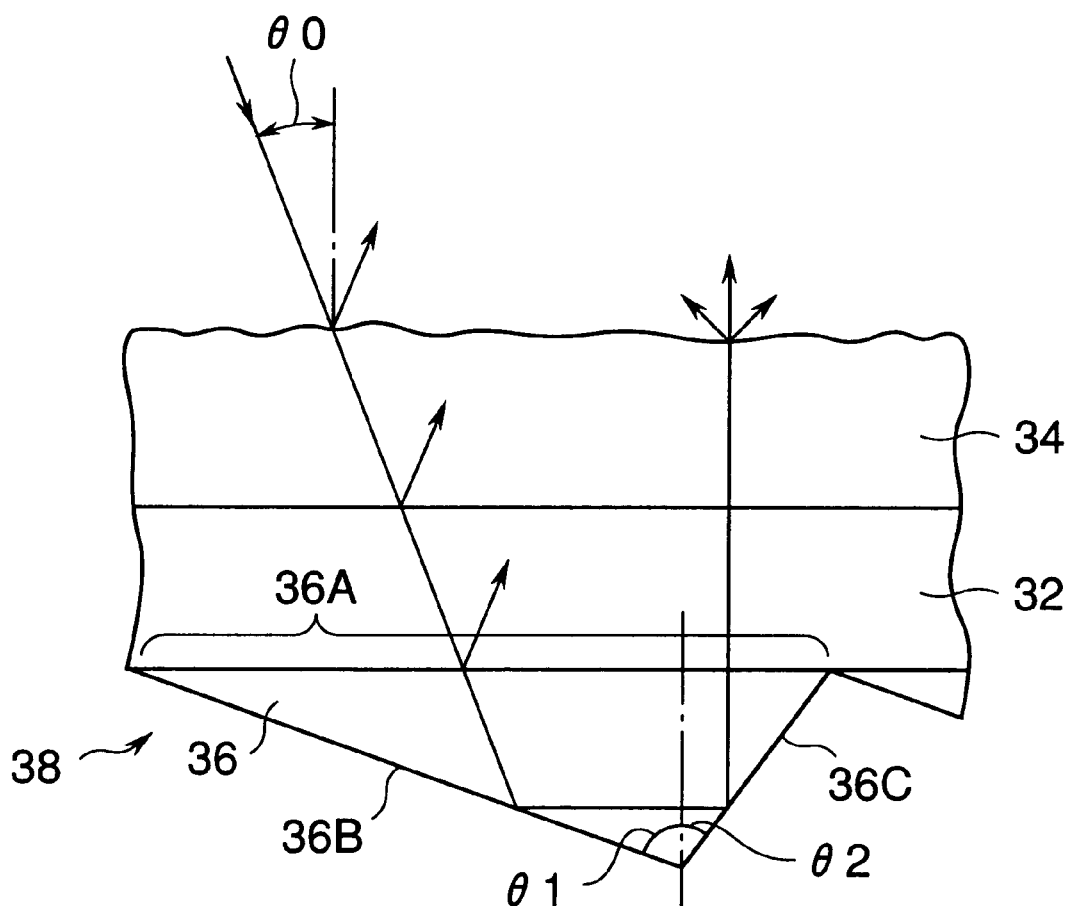
FIG. 2 is a cross-section view that shows a further-enlarged view of the a light reflector for use in a reflective-type liquid-crystal display according to an embodiment of the present invention.

In a light reflector 30 for use in a reflective-type liquid-crystal display as described above, because the unit prism 36 cross-sectional shape is that of a scalene triangle, as shown in FIG. 2, even if reflected light is emitted in a direction that is perpendicular to the rear surface of the transparent base material sheet 32, the incident light will not be parallel to this exiting light.

Therefore, if the exiting light is viewed front-on, it is not parallel to surface-reflected light in the direction of the front surface 32A and rear surface 32B of the transparent base material sheet 32, the result being that even as viewed from a position at which the front of the reflective-type liquid-crystal display is best viewed, there is no disturbance of the appearance thereof by light reflected from a mirror surface.

Figure 3:
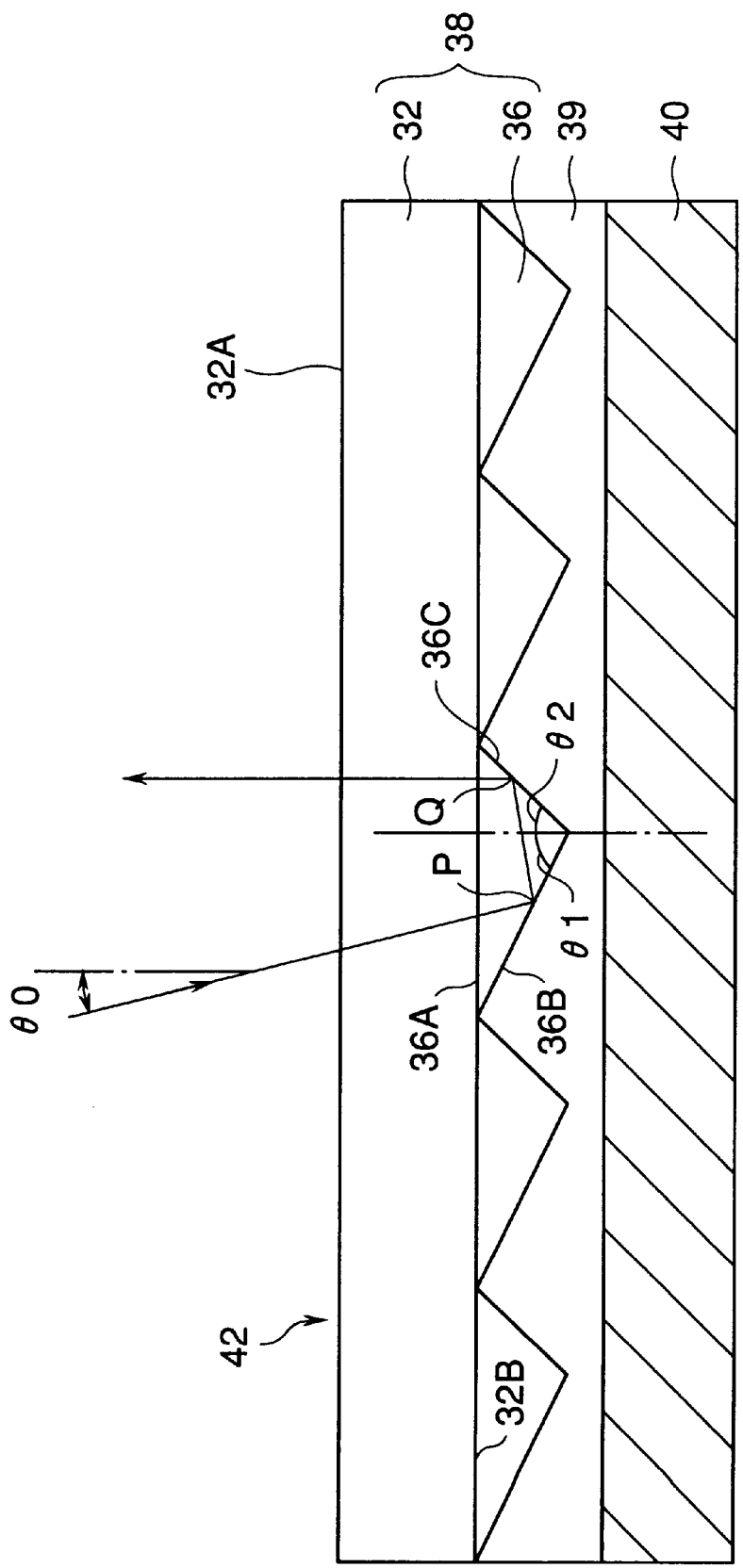
FIG. 3 is an enlarged cross-section view that shows the main part of a light reflector for use in a reflective-type liquid-crystal display according to another embodiment of the present invention.

Furthermore, although in the above-described light reflector 30 for a reflective-type liquid-crystal display panel, there is a light-diffusing layer 34 formed on the transparent base material sheet 32, the present invention is not restricted in this manner, and it is possible, as shown in FIG. 3, to apply the present invention as well to a light reflector 42 which is not provided with a light-diffusing layer.

Next examples 1 and 2 of a light reflector according to the present invention will be described. The materials used in these examples are as follows.

(1) Transparent base material sheet
   125-$\mu$m-thick PET film (Type A4300, manufactured by Toyobo was used.)
(2) Light-diffusing composition
   Binder: polyester resin 43 parts by weight (Vylon 200, manufactured by Toyobo, was used.)
   Light-diffusing substance: polymethyl metacrylate, average particle diameter 10 $\mu$m 100 parts by weight (MBX-10, manufactured by Sekisui Kaseihin Kogyo, was used)
   Diluting solvent: methyl ethyl ketone 60 parts by weight
   Toluene 60 parts by weight (solids portion: 54%)
(3) Prism formation material
   Resin material: UV-curable resin (epoxy acrylate) (Z9002A, manufactured by JSR)
   Refractive index after curing: 1.57
(4) Prism formation material
   Resin material: UV-curable resin (urethane acrylate) (RC17-236, manufactured by Dai Nippon Ink Unideck)
   Refractive index after curing: 1.50
(5) Light-reflecting sheet
   PET foam sheet (Toray E601 or ICI Melinex 329)
Example 1 is described below.

The above-noted (1) transparent base material sheet was used as the transparent base material sheet 32, and the above-noted (2) light-diffusing composition was applied to the surface of the transparent base material sheet, after which it was dried, thereby forming the light-diffusing layer 34.

The above-noted application was done by the coating method, the amount of the application being established as 9 g/m$^2$ after drying.

On the rear surface of the transparent material sheet, which on the opposite surface from the surface on which the above-noted light-diffusing layer 34 was formed, the above-noted (3) prism formation material was used to distribute scalene triangle prisms.

The above-noted scalene triangle prisms, as shown in FIG. 2, are in the form of a stripe, having a cross-sectional vertex angle of 97° ($\theta 1=58.8°$, $\theta 2=38.5°$), with the pitch $\alpha$ between prisms being 0.05 mm.

By doing the above-noted operations, a light-diffusing layer is formed by light-diffusing ink composition that is applied to the front surface of the transparent base material sheet, and a prism sheet with scalene triangle shaped prisms is formed on the rear surface of the transparent base material sheet. The following type of light-reflecting sheet is superimposed on the side on which the scalene triangle prisms are formed on the prism sheet.

The above-noted (5) light-reflecting sheet is laid over, thereby forming the light reflector as shown in FIG. 1.

Figure 4:
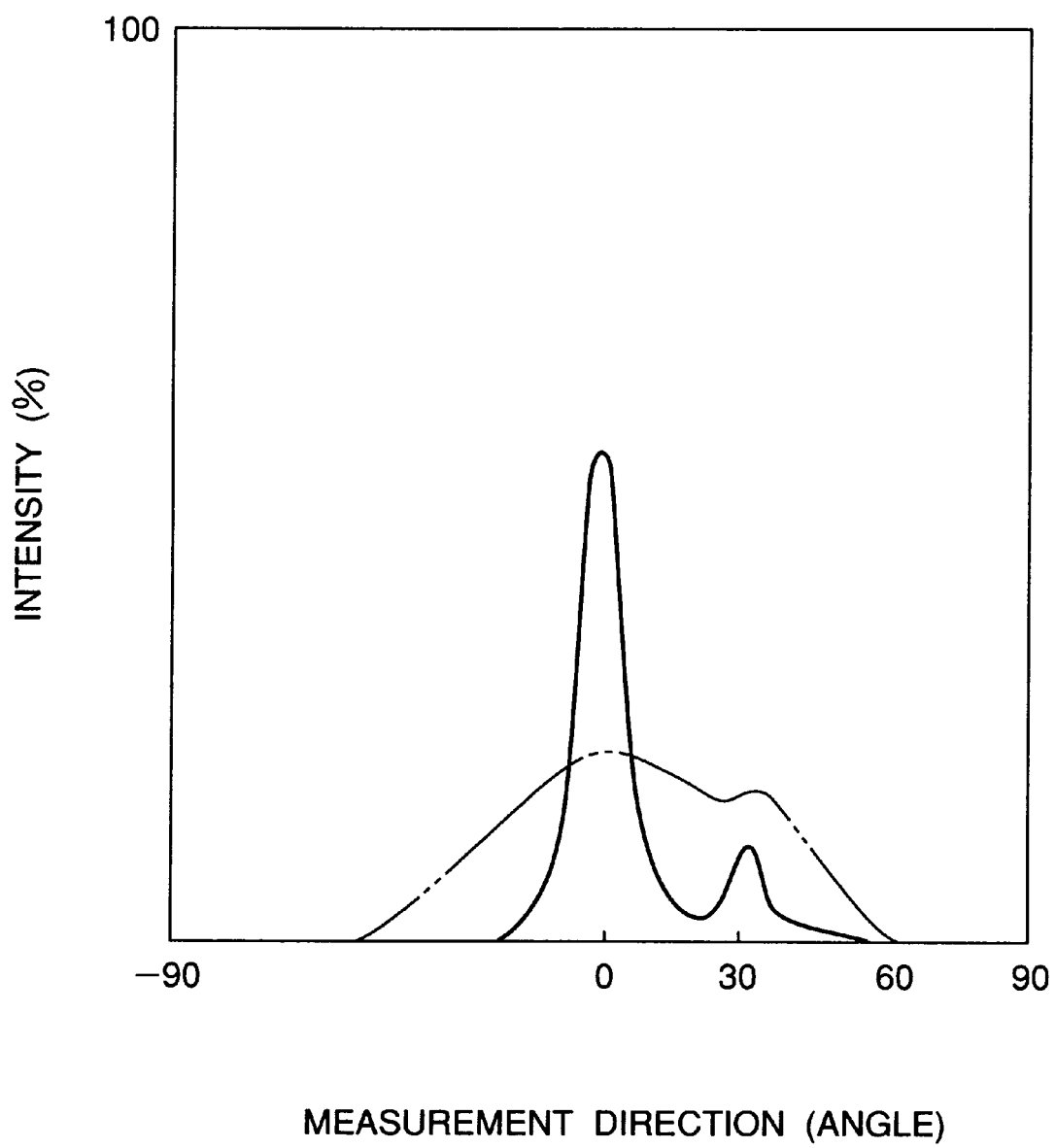
FIG. 4 is a line drawing that shows the result of a measurement of the exiting light in an example of the above-noted light reflector.
Figure 5:
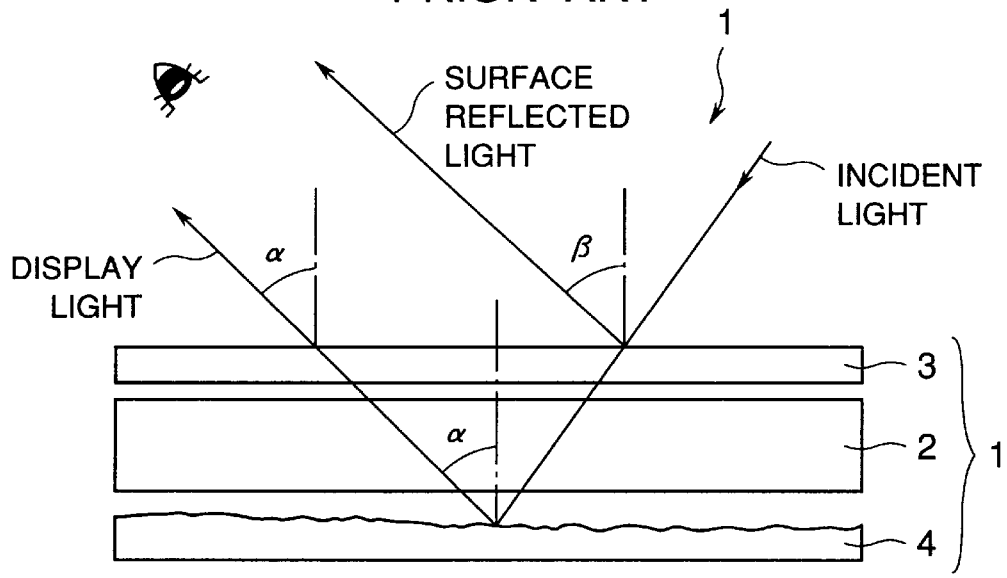
FIG. 5 is a simplified cross-section view that shows a reflective-type liquid-crystal display of the past.
Figure 6:
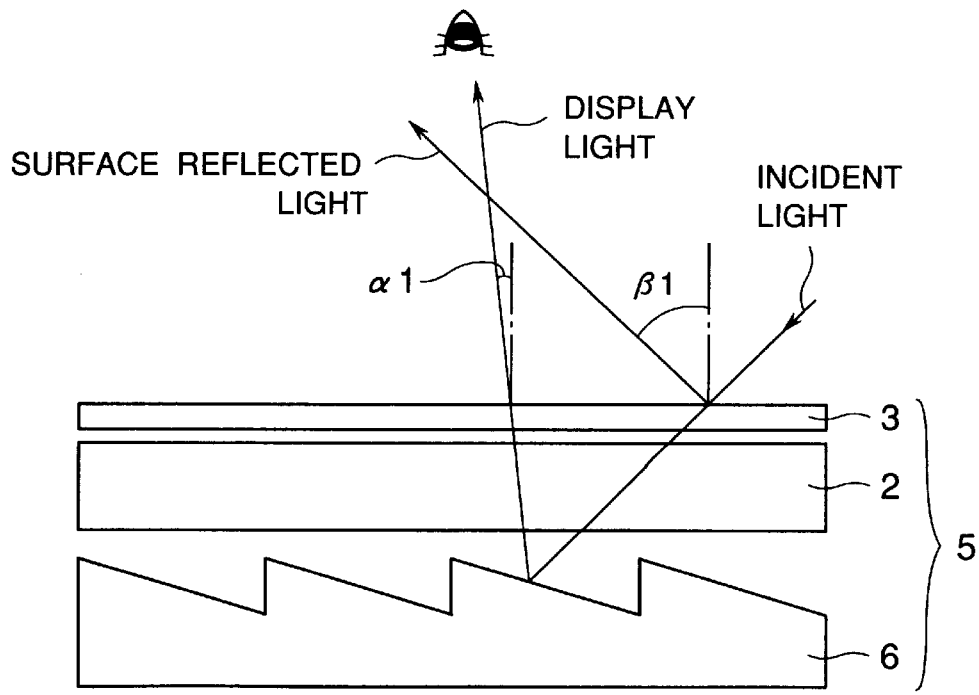
FIG. 6 is a simplified cross-section view that shows another reflective-type liquid-crystal display of the past.

In this example 1, when used in a reflective-type liquid-crystal display, with respect to parallel incident light at an inclination, light exiting from the front, as indicated by the solid line in FIG. 4, is almost at an exit angle of 0°, meaning that light exits straight out toward the front, so that it does not overlap with surface reflections of incident light, thereby eliminating the perception of glare. In the case in which diffused light having an angle of incidence $\theta 0$ of 22°, similar to actual existing light, is caused to strike the display, as indicated by the double-dot broken line in FIG. 4, although the maximum intensity is reduced, reflection characteristics having a wide viewing angle are achieved.

Next, example 2 will be described. In example 2, the above-noted (4) prism formation material is used to distribute scalene triangle prisms on the rear surface of the transparent base material sheet, which is on the opposite side from that on which is formed the above-noted light-diffusing layer 34.

The above-noted scalene triangles have a cross-sectional vertex angle of 100° ($\theta 1=60.0°$, $\theta 2=40.0°$), and all other conditions are the same as noted above with regard to example 1.

In the above-noted example 2, when used in a reflective-type liquid-crystal display, with respect to parallel incident light at an inclination of 30°, or diffused incident light with directionality, characteristics are obtained that are similar to those indicated by the solid line in FIG. 4.

When used in a reflective-type liquid-crystal display, the light reflector according to the present invention causes the directions of incident light and reflected light to be different, so that there is no interference from surface-reflected light, and also achieves the effect of providing an easy-to-view display with a wide viewing angle.

What is claimed is:

1. A light reflector for use in a reflective-type liquid-crystal display that comprises a prism sheet, which is made from a transparent base material, the reverse side of said prism sheet having a plurality of unit prisms that are arranged with a fixed pitch in either one or two dimensions, external light that is incident at the surface of said transparent sheet being internally reflected by oblique surfaces of said unit prisms, so that it passes through said transparent base sheet and exits therefrom, wherein said unit prisms of the prism sheet have the shape of a triangle that has a base that is parallel to the reverse side of said prism sheet and a vertex that protrudes toward the side opposite said reverse side, and wherein if the angle that one of said oblique sides of said triangle makes with respect to a normal direction is $\theta 1$ and the angle that the other oblique side of said triangle makes with respect to said normal direction is $\theta 2$, the refractive index of said prism sheet material is n, and the angle of incidence of external light with respect to a light-diffusing layer on said transparent base material is $\theta 0$, under the condition that $\theta 1 > \theta 2$, said light reflector for a reflective-type liquid-crystal display that satisfies the conditions $$\theta 2 < 90° - \sin^{-1}(1/n)$$

and $$\theta 1 = 90° - \theta 2 + \sin^{-1}(\sin \theta 0/n)/2.$$

2. A light reflector according to claim 1, wherein said angle $\theta 2$ is such that the condition $\theta 2 > \sin^{-1}(\sin \theta 0/n)/2$ is satisfied.

3. A light reflector according to claim 1, wherein said angles $\theta 1$ and $\theta 2$ satisfy the condition $\theta 1 + \theta 2 \geq 180° - 2\{90° - \sin^{-1}(1/n)\}$.

4. A light reflector according to claim 1, wherein the sum $\theta 1 + \theta 2$ is approximately 90°.

5. A light reflector according to claim 1, further comprising a light-diffusing layer that diffusing light, said light-diffusing layer being formed on the surface of the transparent base material sheet.

6. A light reflector according to claim 1, further comprising a light-reflecting sheet that is disposed in opposition to and parallel to said unit prisms of said prism sheet, the surface of said light-reflecting sheet that opposes said unit prisms reflecting transmitted light.

7. A light reflector according to claim 2, further comprising a light-reflecting sheet that is disposed in opposition to and parallel to said unit prisms of said prism sheet, the surface of said light-reflecting sheet that opposes said unit prisms reflecting transmitted light.

8. A light reflector according to claim 1, wherein the material that forms said prism sheet is selected from a group consisting of a UV-cured resin and an EB-cured resin.

* * * * *